(12) United States Patent
Tang et al.

(10) Patent No.: US 8,901,908 B2
(45) Date of Patent: Dec. 2, 2014

(54) METHODS AND APPARATUS FOR DC-DC CONVERSION USING DIGITALLY CONTROLLED ADAPTIVE PULSE FREQUENCY MODULATION

(75) Inventors: Benjamim Tang, Rancho Palos Verdes, CA (US); Amir Babazadeh, Irvine, CA (US)

(73) Assignee: Infineon Technologies Austria AG, Villach (AT)

( * ) Notice: Subject to any disclaimer, the term of this patent is extended or adjusted under 35 U.S.C. 154(b) by 67 days.

(21) Appl. No.: 13/155,295

(22) Filed: Jun. 7, 2011

(65) Prior Publication Data

US 2012/0223693 A1 Sep. 6, 2012

Related U.S. Application Data

(60) Provisional application No. 61/352,778, filed on Jun. 8, 2010.

(51) Int. Cl.
*G05F 1/46* (2006.01)
*H02M 3/157* (2006.01)

(52) U.S. Cl.
CPC ..................... *H02M 3/157* (2013.01)
USPC ......................................... 323/283

(58) Field of Classification Search
CPC .............................. H02M 3/157; G05F 1/46
USPC .................... 323/271, 272, 282–285
See application file for complete search history.

(56) References Cited

U.S. PATENT DOCUMENTS

| 5,568,044 | A | * | 10/1996 | Bittner | 323/272 |
| RE37,609 | E | * | 3/2002 | Bittner | 323/272 |
| 6,577,110 | B2 | | 6/2003 | Van Auken | |
| 6,650,170 | B1 | * | 11/2003 | Uzelac | 327/513 |
| 2006/0055385 | A1 | | 3/2006 | Schiff | |
| 2010/0164455 | A1 | * | 7/2010 | Li et al. | 323/283 |

FOREIGN PATENT DOCUMENTS

DE   10331194 A1   1/2004

* cited by examiner

*Primary Examiner* — Adolf Berhane
*Assistant Examiner* — Yemane Mehari
(74) *Attorney, Agent, or Firm* — Murphy, Bilak & Homiller, PLLC

(57) ABSTRACT

A method and apparatus for regulating voltage comprising calculating a first PFM on time and a second PFM on time and selecting one the PFM on times according to a selection criteria. Then activating and deactivating at least one switch according to the selected PFM on time.

25 Claims, 8 Drawing Sheets

METHODS AND APPARATUS FOR DC-DC CONVERSION USING DIGITALLY CONTROLLED ADAPTIVE PULSE FREQUENCY MODULATION

CROSS-REFERENCES TO RELATED APPLICATIONS

This application claims the benefit of U.S. Provisional Patent Application No. 61/352,778, filed Jun. 8, 2010, entitled METHODS AND APPARATUS FOR PULSE FREQUENCY MODULATION and incorporates the disclosure of such application by reference.

BACKGROUND OF INVENTION

Regulated power supplies or voltage regulators are typically required to supply voltage and current to microelectronic devices. The voltage regulators are typically designed to convert power from a primary source to an electrical load at the specified voltage. Switching power converters (SPCs) are commonly used voltage regulators due to their high efficiency, high current capability, and topology flexibility. In addition, they can be designed to provide very precise voltage and current characteristics required by devices such as microprocessors, microcontrollers, memory devices, and the like.

Power requirements for emerging leading edge technology microprocessors have become very difficult to satisfy. As the speed and integration of microprocessors increases, the demands on the power regulation system also increase. In particular, as gate counts increase, the current demand increases, the operating voltage decreases and transient events (e.g., relatively large voltage spikes or droops at the load) typically increase in both magnitude and frequency. Some emerging microprocessors are expected to run on less than 1.3 volts and more than 100 amperes.

SPCs utilizing step-down multi-phase buck regulators have been the preferred topology to meet the low voltage and high current requirements of microprocessors. With the advent of increasingly complex power regulation topologies, digital techniques for power converter control can improve precision and reduce the system's total parts count while also supporting multiple applications in the same power system through digitally programmable feedback control.

SUMMARY OF THE INVENTION

A method and apparatus for regulating voltage comprising calculating a first PFM on time and a second PFM on time and selecting one of the PFM on times according to a selection criteria. Then activating and deactivating at least one switch according to the selected PFM on time.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various resistors, transistors, capacitors, inductors, digital logic circuits, driver circuits, comparators, voltage supplies, measurement sensors, and the like, which may carry out a variety of functions. In addition, the present invention may be practiced in conjunction with any number of circuits and systems, and the integrated circuit system described is merely one exemplary application for the invention.

Figure 1:
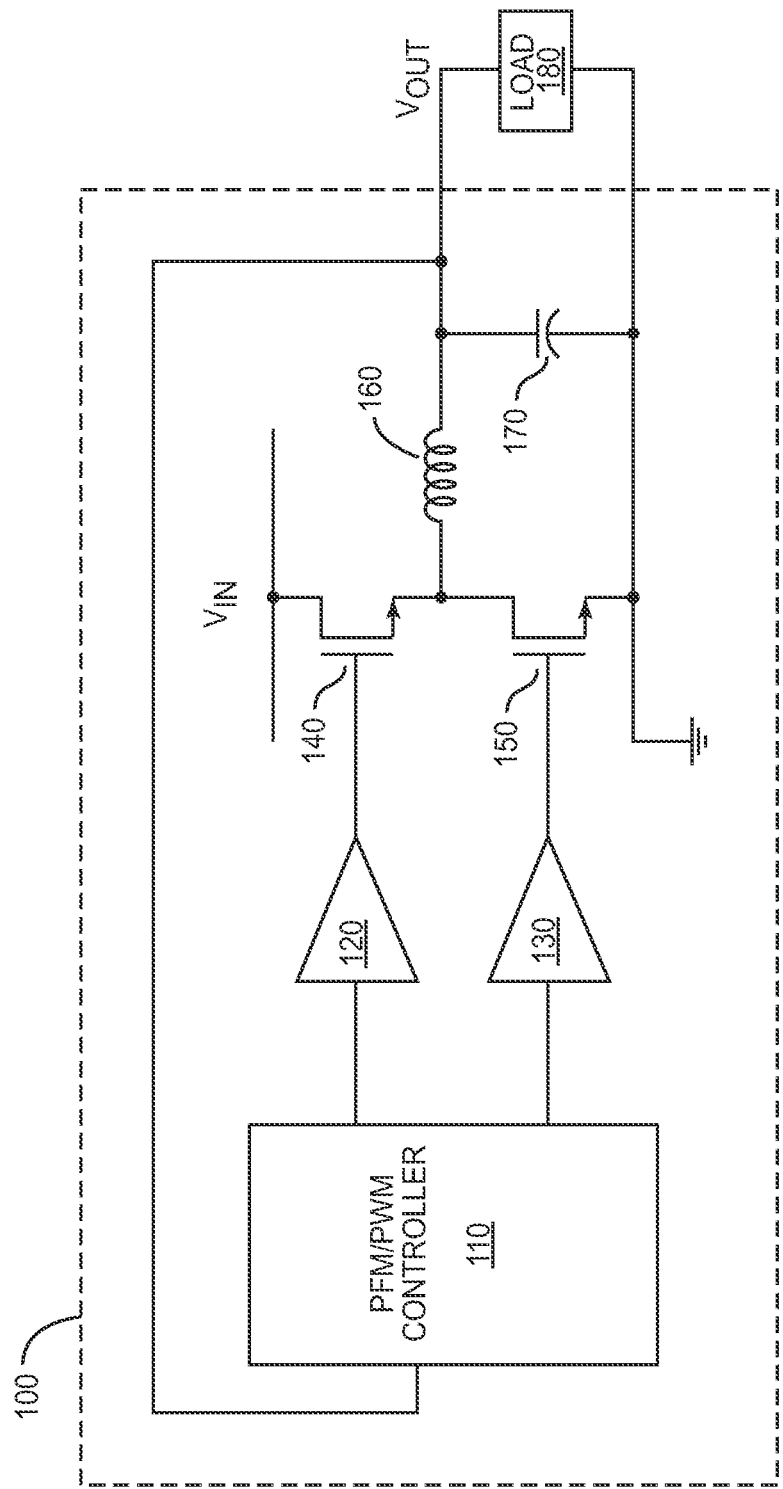
FIG. 1 is a schematic showing a switching regulator featuring a PFM/PWM controller.

Referring to FIG. 1, an exemplary switching regulator 100 according to various aspects of the present invention may operate in one or more switching modes. In this embodiment, the switching regulator 100 comprises a controller 110 that controls the output of the regulator 100, for example by driving one or more switching circuits according to one or more operating parameters and/or inputs, such as a voltage feedback signal from the load. For example, the controller 110 may control the output of the regulator 100 by controlling one or more switches 140, 150. The switches 140, 150 may be controlled directly by the controller 110 or via intermediate devices, such as one or more switch drivers 120, 130.

In the present embodiment, the controller 110 provides an output to the first and second switch drivers 120, 130. The switch drivers 120, 130 provide drive signals to the switches 140, 150 according to the signals from the controller 110. The first switch driver 120 drives a power (high-side) switch 140. When the power switch 140 is activated, current flows from the input power supply and through an output inductor 160 to a load 180. The second switch driver 130 drives a synchronous (low-side) switch 150. When the synchronous switch 150 is activated, the output inductor 160 is connected to ground. When both switches 140, 150 are deactivated, the inductor 160 is connected to an open circuit, inhibiting current flow. In some cases, the switches 140, 150 connecting the load to the input power supply and the ground may be open, but the inductor current may still be non-zero. This may be due, for example, to current flowing through a parasitic diode in one of the switches.

The switch drivers 120, 130 may comprise any appropriate elements or systems for driving the switches 140, 150, such as conventional switch driver circuits. In some embodiments, the drivers 120, 130 may be omitted such that the controller 110 directly drives the switches 140, 150. The switches 140, 150 may comprise any suitable switches for providing power to the load 180 according to signals from the controller 110. In addition, the switching regulator 100 may comprise multiple phases, such that the controller 110 drives multiple sets of switches 140, 150 and/or switch drivers 120, 130.

The output of the switching regulator 100 may be filtered, for example to provide a smooth output. The filtering and/or smoothing may be performed by any appropriate filter or smoothing circuit, such as a conventional LC filter. In one embodiment, the switching regulator 100 may include an output inductor 160 and a capacitor 170. The inductor 160 and capacitor 170 may be configured as a filter to smooth the output supplied to the load 180.

While the present embodiment is discussed in conjunction with a buck converter, various aspects of the present invention may be practiced in conjunction with other switching regulator topologies, such as converters using step-down, step-up, boost, buck-boost, forward, flyback, half-bridge, full-bridge, and/or SEPIC topologies.

The switching regulator 100 may provide power to the load 180 in conjunction with one or more switching modes, which may be selected and enabled according to any appropriate criteria. For example, the switching regulator 100 may operate in a continuous current mode (CCM) and a discontinuous current mode (DCM), although alternative embodiments may implement different and/or additional switching modes, or a single switching mode such as DCM.

The different switching modes may be selected to achieve any appropriate objectives and/or performance results. For example, CCM may comprise alternately coupling a load to an input power supply and to a power supply return/ground. In CCM, current flows substantially continuously, either in a positive or negative direction (other than at the point of a zero crossing).

CCM may be effected in any appropriate manner, such as in conjunction with pulse width modulation (PWM). For example, a pulse width modulator may alternately activate a power switch and a synchronous switch. The power switch connects the input voltage supply to the load, while the synchronous switch connects the load to ground. The power switch and synchronous switch are alternately activated such that current substantially flows through only one switch or the other at any given time.

In DCM, the current does not substantially continuously flow, but instead settles to substantially zero during at least a portion of the switching interval. For example, the switching regulator 100 may alternately couple the load to the input power supply, to ground, and to an open circuit, such as by simultaneously opening both the power switch and the synchronous switch. During DCM operation, current is substantially inhibited from flowing across the inductor in the negative direction. In DCM, the inductor current increases when the load is coupled to the input supply, decreases to substantially zero when the load is coupled to ground, and remains at substantially zero while the load is connected to an open circuit.

DCM operation may be implemented in any appropriate manner, such as in conjunction with pulse frequency modulation (PFM). For example, a pulse frequency modulator may encode an analog signal with a waveform. The PFM controller may utilize pulses that are limited to two or more discrete amplitudes where the pulse durations are substantially constant. In one embodiment, the PFM controller generates three possible outputs, including a high output, which couples the load to the input supply; a low output, which couples the load to ground; and a high impedance (HIZ) output, which opens both the high-side and low-side switches, effectively coupling the load to an open circuit. The output voltage may be adjusted by varying the frequency of the pulses, for example by adjusting the duration of the HIZ period. This encodes the analog signal information into a duty cycle or average voltage of the waveform.

The switching regulator 100 operating in DCM using PFM may exhibit enhanced power efficiency, for example because there are no conduction losses associated with a negative current flowing through the output inductor. Furthermore, the pulse frequency may be lower than when the DC-DC converter is operating under CCM with a fixed frequency modulation method such as PWM. On the other hand, PFM operation may suffer from a higher ripple voltage and is susceptible to voltage sag at higher current demands. Thus, PFM may be better suited for lighter loads.

Figure 2:
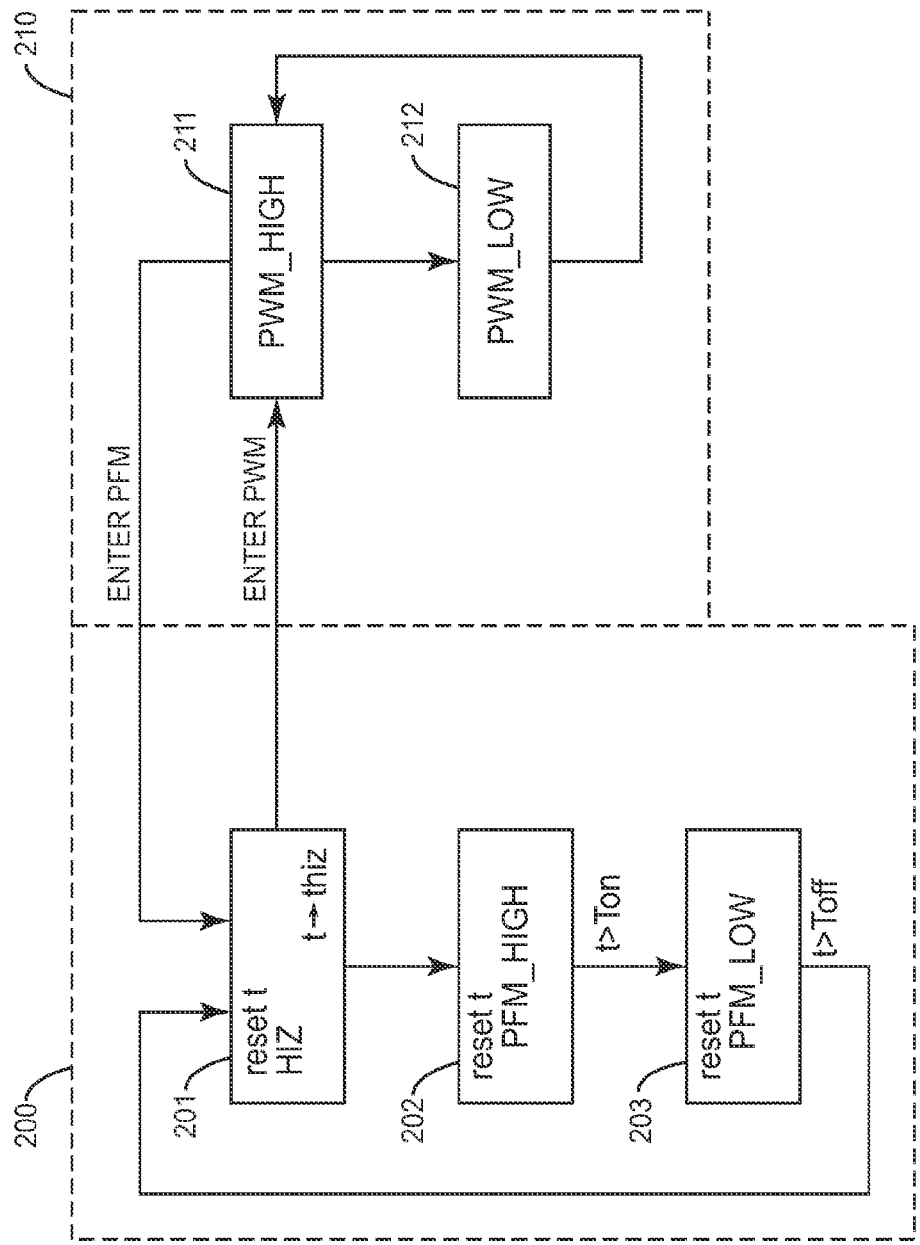
FIG. 2 illustrates a schematic showing an embodiment of a PFM/PWM controller.

The switching regulator 100 of the present embodiment may implement CCM, DCM, and/or any other appropriate switching modes, for example in conjunction with PWM, PFM, and/or other modes of operation. Referring to FIGS. 1 and 2, the controller 110 may operate in PFM mode 200 and PWM mode 210. The PFM mode 200 may comprise three stages, a HIZ stage 201, a PFM high stage 202, and a PFM low stage 203. The PWM mode 210 may comprise two stages, a PWM high stage 211 and a PWM low stage 212.

In the present embodiment, the controller 110 may operate in a conventional PWM mode 210, such as in conjunction with a PWM high stage 211 and a PWM low stage 212. During the PWM high stage 211, the load 180 may be connected to the input power supply via the power switch 140. During the PWM low stage 212, the load 180 may be connected to ground via the synchronous switch 150.

Figure 3:
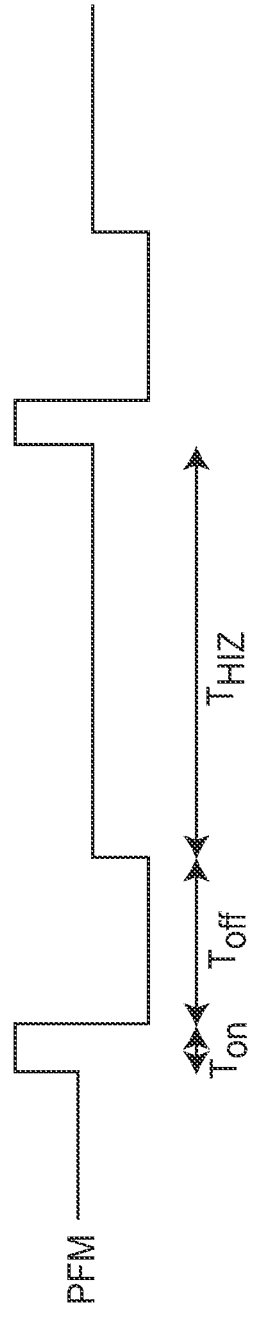
FIG. 3 illustrates a waveform for driving switch circuits a PFM operation.
Figure 4:
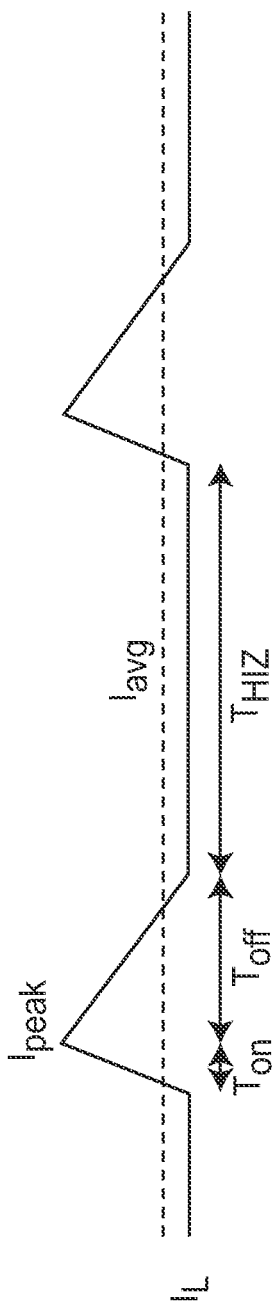
FIG. 4 illustrates an output inductor current waveform in PFM operation.

Referring now to FIGS. 2-4, the controller 110 may alternately operate in PFM mode 200. For PFM operation, the controller 110 may operate in a HIZ stage 201, a PFM high stage 202, and a PFM low stage 203. During the HIZ stage 201 (HIZ time $T_{HIZ}$ in FIGS. 3 and 4), the controller 110 may output a HIZ signal to the driver circuits 120, 130 to open both switches 140, 150, and substantially zero current flows through the output inductor 160.

During the PFM high stage 202 (PFM on-time $T_{on}$ in FIGS. 3 and 4), the controller 110 may activate the high-side switch 140 and deactivate the low-side switch 150. While the controller 110 outputs the PFM high stage signals, current flows from the input power supply of the switching regulator 100 to the load 180 through the power switch 140, and the output inductor current may increase. Current flows in the positive direction through the output inductor 160 to the load 180, and peak inductor current $I_{peak}$ may be achieved at the end of the PFM on-time $T_{on}$.

The controller 110 may also enter the PFM low stage 203 (PFM off-time $T_{off}$ in FIGS. 3 and 4). In one embodiment, the controller 110 deactivates the power switch 140 and activates the synchronous switch 150 during the PFM off-time $T_{off}$. During the PFM low stage 203, the load 180 is connected to ground through the synchronous switch 150. Thus, the output inductor current may decrease to zero or near zero through the synchronous switch 150. After the PFM off-time $T_{off}$ has ended, output inductor current may have decreased to substantially zero, and the controller 110 may return to the HIZ stage 201.

The duration of the PFM off-time $T_{off}$ may be determined according to any appropriate criteria, such as to terminate as the inductor current is approximately zero. In one embodiment, the PFM off-time $T_{off}$ lasts until a measured output inductor current is zero. In another embodiment, the duration of the PFM off-time $T_{off}$ may be based on an estimate of when the output inductor current is zero. When the controller 110 has been in the PFM low stage 203 for the PFM off-time $T_{off}$, the controller 110 may leave the PFM low stage 203 and return to the HIZ stage 201.

The output voltage $V_{out}$ may be adjusted by controlling the duration of the one or more of the various PFM stages 201, 202, 203. For example, by adjusting the length of the HIZ time $T_{HIZ}$, the output voltage may be controlled. The controller 110 may remain in the HIZ stage 201 until selected criteria are met, such as when the output voltage is no longer substantially equal to the reference voltage (i.e., a voltage error is no longer substantially zero ($Y_{err}$>0)), or when the output voltage crosses some other relevant threshold. In one embodiment, the duration of the HIZ time $T_{HIZ}$ may be increased, causing the frequency of the PFM high stage 202 and the PFM low stage 203 to decrease (if the durations of the PFM high stage 202 and the PFM low stage 203 are substantially fixed). Thus, the average output inductor current $I_{avg}$ and the average output voltage decrease. Conversely, if the duration of $T_{HIZ}$ decreases, the frequency of the output high stage 202 and the PFM low stage 203 increases, resulting in an increase in output voltage and current.

To operate in multiple modes, such as CCM and DCM, the controller 110 of the present embodiment may control the switching mode of the switching regulator 100. In one embodiment, the controller 110 controls whether the switching regulator 100 operates in CCM or DCM, for example by switching between PFM mode and PWM mode. The controller 110 may be configured to select an operating mode according to any suitable criteria, such as to optimize or improve efficiency and/or maintain sufficient voltage and current levels to supply the demand of the load 180. For example, when output current demand is low, it may be more efficient to operate in DCM, and the controller 110 may operate in PFM mode to effect DCM operation. Conversely, when output current demand is relatively high, it may be more effective to operate in CCM than in DCM. Thus, when output current is relatively high, the controller 110 may operate in PWM mode to effect CCM operation. The controller 110 may exit the PWM mode according to any suitable criteria, such as when the output current drops below the output current threshold.

Selecting the operating mode may be controlled or affected by any relevant criteria. For example, the operating mode may be selected according to a ripple in the output voltage and/or current. The voltage and/or current ripple may comprise a varying component of the generally DC output signal. In the present embodiment, the operating mode of the switching regulator 100 may be selected according to characteristics of the output voltage and/or current ripple, such as the magnitude of the voltage and/or current ripple. For example, operation in DCM and may tend to increase the output voltage ripple, especially when the load demand increases and/or the switching frequency is relatively low. If the voltage ripple exceeds a selected voltage ripple threshold, the controller 110 may cease PFM operation and switch to PWM operation.

The operating mode may also (or instead) be selected according to other criteria, such as a maximum PFM current threshold. For example, the controller 110 may operate in PFM mode if the output current is below a maximum PFM current threshold. In one embodiment, the controller 110 may transition to the PWM mode if either the output current exceeds the output current threshold or the voltage ripple exceeds the voltage ripple threshold.

The controller 110 may be configured to switch to PWM according to any suitable criteria. For example, the controller 110 may monitor the error voltage ($Y_{err}$) (the difference between the target voltage output of the regulator and the actual voltage output) and enter the PWM mode 210 when the error voltage is greater than a maximum PFM voltage threshold. The controller 110 may also monitor the duration of the HIZ stage 201 and switch to PWM mode when a HIZ time $T_{HIZ}$ is shorter than a HIZ minimum threshold $T_{HIZ\_MIN}$, such as a minimum threshold calculated to minimize output voltage ripple from the switching regulator 100.

Figure 5:
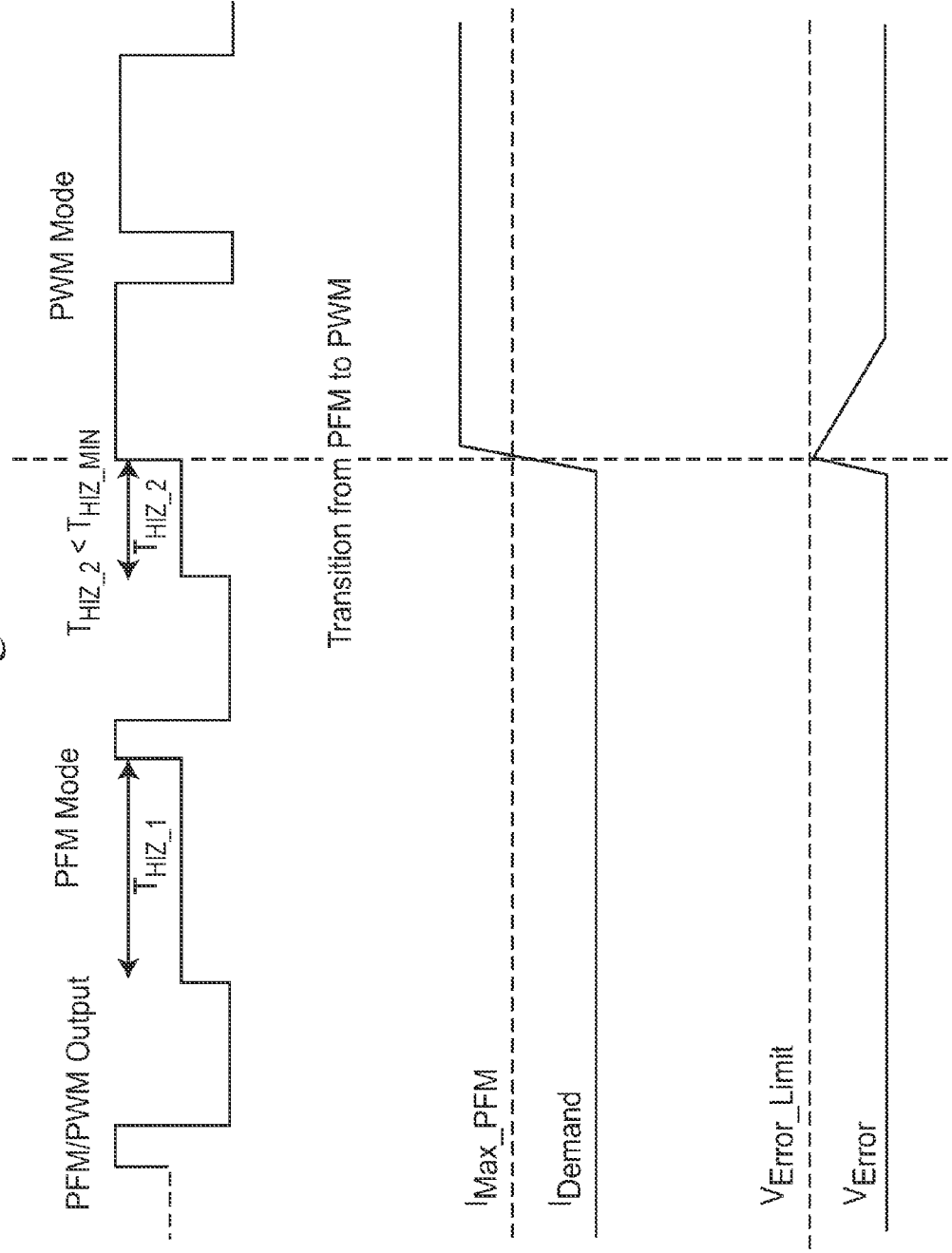
FIG. 5 illustrates output inductor current corresponding to PFM timing.

Referring to FIG. 5, a transition from PFM mode to PWM mode may occur in response to an increase in load current demand $I_{demand}$ and/or an increase in voltage error $V_{err}$. As the current demand $I_{demand}$ from the load increases, the HIZ time $T_{HIZ}$ is reduced from a first HIZ time $T_{HIZ\_1}$ to a second HIZ time $T_{HIZ\_2}$ to increase output current. A large increase in the current demand $I_{demand}$ may result in a current demand greater that the maximum PFM current threshold $I_{Max\_PFM}$. In response, the controller 110 may transition from the PFM mode 200 to the PWM mode 210.

The switching regulator 100 may be inhibited from supplying proper voltage under certain conditions, causing an error voltage $V_{error}$ to increase. The controller 110 may transition from the PFM mode 200 to the PWM mode 210 after the error voltage $V_{error}$ exceeds an error threshold $V_{Error\_Limit}$.

In one embodiment, the transition between the PFM mode 200 and the PWM mode 210 may take advantage of the current controller 110 state. For example, if the controller 110 is in the PFM high stage 202 when the controller 110 is transitioning from the PFM mode 200 to the PWM mode 210, the controller 110 may transition directly to the PWM high stage 211. Likewise, if the controller 110 is operating in the PWM mode 210 and the current drops below a minimum PWM current threshold, the controller 110 may transition from the PWM low stage 212 to the PFM low stage 203.

The controller 110 may operate in PFM mode according to any appropriate characteristics and parameters. For example, the controller 100 may operate in an adaptive PFM mode to control the duration and/or other characteristics of the HIZ stage 201, PFM high stage 202, and PFM low stage 203. The PFM operation may be affected by other relevant parameters, such as programmable parameters to set the output ripple and the peak inductor current limit. The controller 110 may adjust the on time and off time for PFM operation which optimize for the output ripple under a maximum inductor current constraint, while minimizing the operating frequency to maximize efficiency. The on time and off time computations may be dynamically updated to track changes in operating conditions. The adjustments to the on and off times may maintain the output ripple relatively fixed and keep the peak inductor current high without violating the maximum peak current constraint before switching to PWM operation.

In one embodiment, the duration of one or more of the stages 201, 202, 203 may be affected by the maximum peak current value and/or a constant ripple solution based on a fixed combined duration of the PFM high stage 202 and PFM low stage 203. The durations of the PFM high stage 202 and PFM low stage 203 may be computed and periodically or continuously updated. To regulate the voltage, the HIZ stage 201 may be controlled, for example in conjunction with a closed loop feedback system. The HIZ stage 201 may be controlled to maintain a minimum output voltage, such as in conjunction with a comparator in a servo-loop.

The PFM on-time $T_{on}$ may be selected according to any appropriate criteria. The PFM on-time $T_{on}$ may be set at a constant value or controlled dynamically, such as periodically adjusted or substantially continuously adjusted. In one embodiment, the PFM on-time $T_{on}$ may be selected so that when the controller 110 is in the PFM mode 200, the voltage ripple does not exceed the voltage ripple threshold and/or the output inductor current does not exceed the maximum PFM current threshold. The PFM on-time $T_{on}$ may also be adjusted according to any other appropriate criteria, such as to reduce the PFM on-time $T_{on}$ when the load current is low and/or the switching frequency approaches an audio range, such as in the range below about 20 kHz.

The PFM on-time $T_{on}$ may be selected according to conventional criteria, such as in conjunction with a "fixed" or "constant" $T_{on}$ scheme ($T_{on}$=constant), a "proportional" $T_{on}$ scheme associated with a constant total PFM on-time $T_{on}$ and PFM off-time $T_{off}$ ($T_{on}$+$T_{off}$=constant), and/or a "constant ripple" or "adaptive on time" scheme based on the input and output voltages. In one embodiment, the controller dynamically adjusts the PFM on-time $T_{on}$ according to a hybrid constant ripple and peak current approach to operate over a large range of operating conditions while optimizing efficiency and minimizing output ripple. For example, the controller 110 may control $T_{on}$ to effect a constant ripple approximation at low voltage output and a constant ripple current or peak current approximation at high voltage. In particular, the controller 110 may operate within maximum voltage ripple conditions and maximum current conditions.

In one embodiment, the PFM on-time $T_{on}$ is dynamically recalculated according to one or more variables and/or static values. For example, the duration of the PFM high stage 202 may be determined according to various values, such as the input voltage, the target output voltage, the inductance of the inductor 160, the period of the main clock for the controller 110, the maximum PFM current threshold, and/or the capacitance of the capacitor 170. In one embodiment, the PFM on-time $T_{on}$ may be calculated, in part, based on the constant peak current and in conjunction with a "constant $T_{on}$" scheme. For example, the PFM on-time $T_{on}$ may be determined according to the following equation:

$$t_{on\_constant} = \frac{k}{V_{in} - V_{out}}$$

In the above constant $T_{on}$ equation, $V_{in}$ is the input supply voltage and $V_{out}$ is the output voltage. The constant k takes into account a maximum acceptable current, such as the maximum PFM current threshold, which controls the ripple current, and the value of the output inductor 160. The constant $T_{on}$ value may thus be determined according to the following equation:

$$t_{on\_constant} = imax \cdot L \cdot \frac{1}{V_{in} - V_{out}} \approx imax \cdot L \cdot \frac{1 + \frac{V_{out}}{V_{in}}}{V_{in}}$$

where imax is the maximum PFM current threshold. Using this equation for constant $T_{on}$, the maximum PFM current threshold controls the current ripple. While a constant $T_{on}$ value tends to maintain the current below the maximum PFM current threshold, it may also allow greater voltage ripple at low output voltages.

The PFM on-time $T_{on}$ may also (or alternatively) be calculated using a "proportional $T_{on}$" scheme, for example according to the ratio of the output voltage to the input voltage. For example, the proportional $T_{on}$ may be calculated according to the following equation:

$$t_{on\_proportional} = k \cdot \frac{V_{out}}{V_{in}}$$

where the constant k corresponds to a constant associated with the acceptable voltage ripple and the current switching period of the controller 110. For example, the proportional $T_{on}$ value may be calculated as shown in the following equation:

$$t_{on\_proportional} = \text{pfm\_alpha} \cdot \text{pwm\_cnt} \cdot \frac{V_{out}}{V_{in}}$$

where pfm_alpha is a value representing the acceptable voltage ripple and pwm_cnt is the ratio of the switching period $T_{sw}$ over the clock period $T_{clk}$. A proportional $T_{on}$ value may offer improved voltage ripple, but as the output voltage decreases, the current handling capability of the system tends to decrease.

In another embodiment, a constant ripple $T_{on}$ may be calculated. This approach uses the square root of a function of the input and output voltages as shown in the following equation:

$$t_{on\_constant\_ripple} = k \cdot \frac{V_{out}}{\sqrt{(V_{in} \cdot (V_{in} - V_{out}))}}$$

In one embodiment, a hybrid method is used to calculate the PFM on-time $T_{on}$. For example, the controller 110 may calculate multiple candidate $T_{on}$ values and select one. In addition, the controller 110 may combine multiple values for $T_{on}$ to generate additional $T_{on}$ values.

For example, the controller 110 may combine the calculated "proportional $T_{on}$" and "constant $T_{on}$" values. This equation may then be approximated to be a function the $T_{on\_constant}$ and $T_{on\_proportional}$ as shown in the following equation:

$$T_{on\_combined} = \sqrt{t_{on\_proportional} \cdot t_{on\_constant}} \approx 0.66 \cdot t_{on\_proportional} + 0.33 \cdot t_{on\_constant}$$

The combined value may allow for a constant ripple approximation at a low output voltage and a constant ripple maximum current or maximum peak current) at higher output voltages.

In addition, the controller 110 may compare the possible $T_{on}$ values and select one based on a selection criteria, such as the shortest $T_{on}$ value. In one embodiment, the controller 110 may compare the combined $T_{on}$ value with the constant $T_{on}$ value and select the shortest $T_{on}$ value to control both the output voltage ripple and the ripple current. Thus, the hybrid $T_{on}$ value may be expressed as:

$$T_{on\_Hybrid} \approx \min((0.66 \cdot T_{on\_proportional} + 0.33 \cdot T_{on\_constant}), T_{on\_constant})$$

The duration of the PFM low stage 203 may be selected according to any appropriate criteria. For example, the PFM off-time $T_{off}$ may be terminated upon detection of the current reaching or nearing zero. Alternatively, the PFM low stage 203 duration may be selected according to a zero current estimate instead of a zero current detection. The PFM low stage 203 duration may also be adjusted according to an offset, such as a programmable delay offset adapted to compensate for a power stage delay.

The calculation for the PFM off-time $T_{off}$ may comprise a function of the PFM on-time $T_{on}$ and the input and output voltages. In one embodiment, the relationship between the PFM on-time $T_{on}$ and the PFM off-time $T_{off}$ with the input and output voltages may be described by the following equation:

$$\frac{T_{off}}{T_{on}} = \frac{V_{in} - V_{out}}{V_{out}}$$

The PFM off-time $T_{off}$ may be calculated according to the selected PFM on-time $T_{on}$. In one embodiment, an adjustment parameter pfm_$T_{off}$_adjust is added to extend or reduce $T_{off}$ resulting in the following equation:

$$T_{off} = \left(\frac{V_{in}}{V_{out}} - 1\right) \cdot T_{on} - \text{pfm\_}T_{off}\text{\_adjust}$$

The PFM off-time $T_{off}$ may be calculated so that the PFM off-time $T_{off}$ ends as the output inductor current is estimated to fall to zero. Thus, in this embodiment, $T_{off}$ may be calculated first and then $T_{on}$ may be calculated using the relationship between $T_{on}$, $T_{off}$, $V_{in}$, and $V_{out}$. In one embodiment, the output current estimate pfm_iload_est comprises a function of the clock $T_{clk}$, the output inductance L, the input voltage $V_{in}$, the output voltage $V_{out}$, $T_{on}$, $T_{off}$, and the PFM output current pfm_current. The estimated output inductor current may be calculated using the following equation:

$$\text{pfm\_iload\_est} = \frac{Tclk}{2 \cdot L} \cdot (V_{in} - V_{out}) \cdot \text{pfm\_ton} \cdot \frac{\text{pfm\_ton} + \text{pfm\_toff}}{\text{pfm\_current}}$$

The PFM current (pfm_current) may be described as a function of the frequency of the clock being low Fclk_lo and the frequency of the PFM, Fpfm or it may be described as a function of $T_{HIZ}$, $T_{on}$, and $T_{off}$ as shown in the following equation:

$$\text{pfm\_current} = \frac{\text{Fclk\_lo}}{Fpfm} = T_{HIZ} + T_{on} + T_{off}$$

In one embodiment, the length of the PFM off-time $T_{off}$ may be chosen based on when the current through the output inductor 160 is measured to be zero. This may be done using a detection circuit, such as a comparator.

Figure 6:
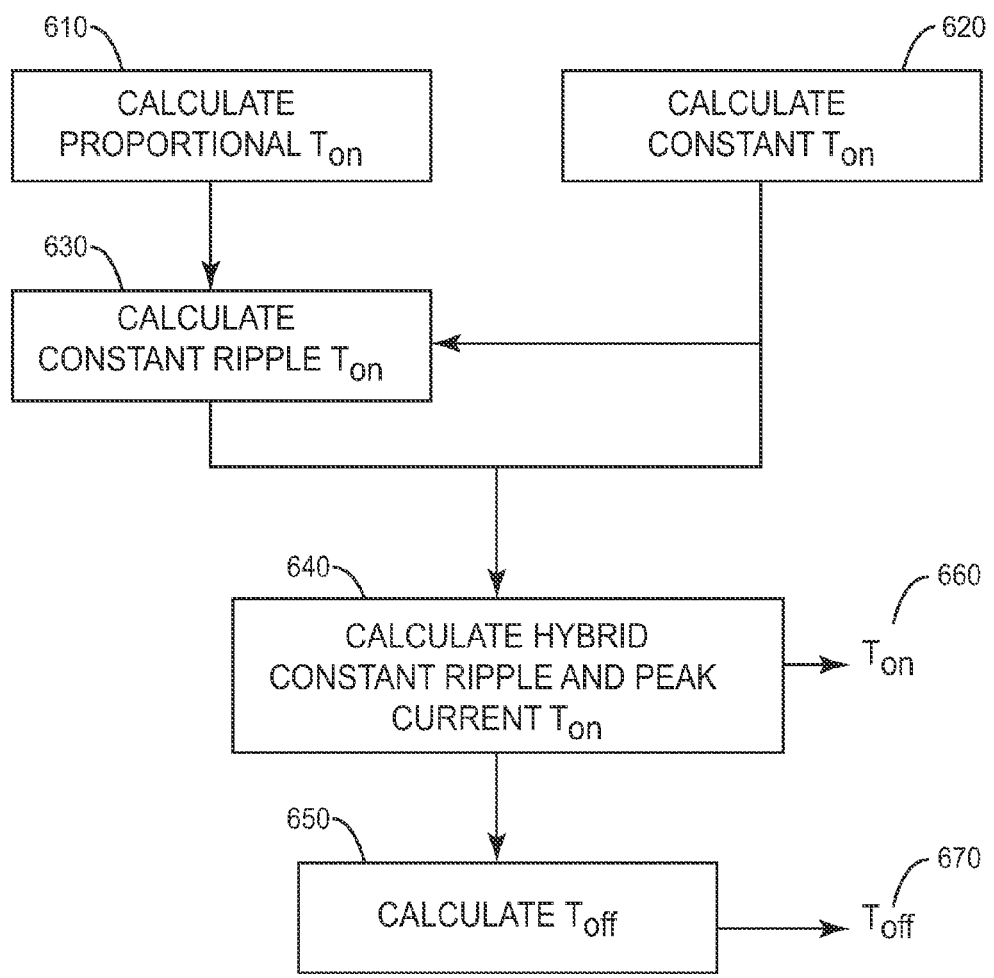
FIG. 6 illustrates a method of computing PFM timing.

Referring now to FIG. 6, a method of calculating the PFM on-time $T_{on}$ and the PFM off-time $T_{off}$ comprises calculating proportional $T_{on}$ (610) and constant $T_{on}$ (620). Proportional $T_{on}$ and constant $T_{on}$ may be used to calculate constant ripple $T_{on}$ (630). Hybrid $T_{on}$ may be calculated using constant ripple $T_{on}$ and constant $T_{on}$ (640). Hybrid $T_{on}$ may then be used to calculate the PFM off-time $T_{off}$. The values of the PFM on-time $T_{on}$ and the PFM off-time $T_{off}$ may then be outputted (660) (670) and used by the controller 110 during the PFM mode 200.

Figure 7:
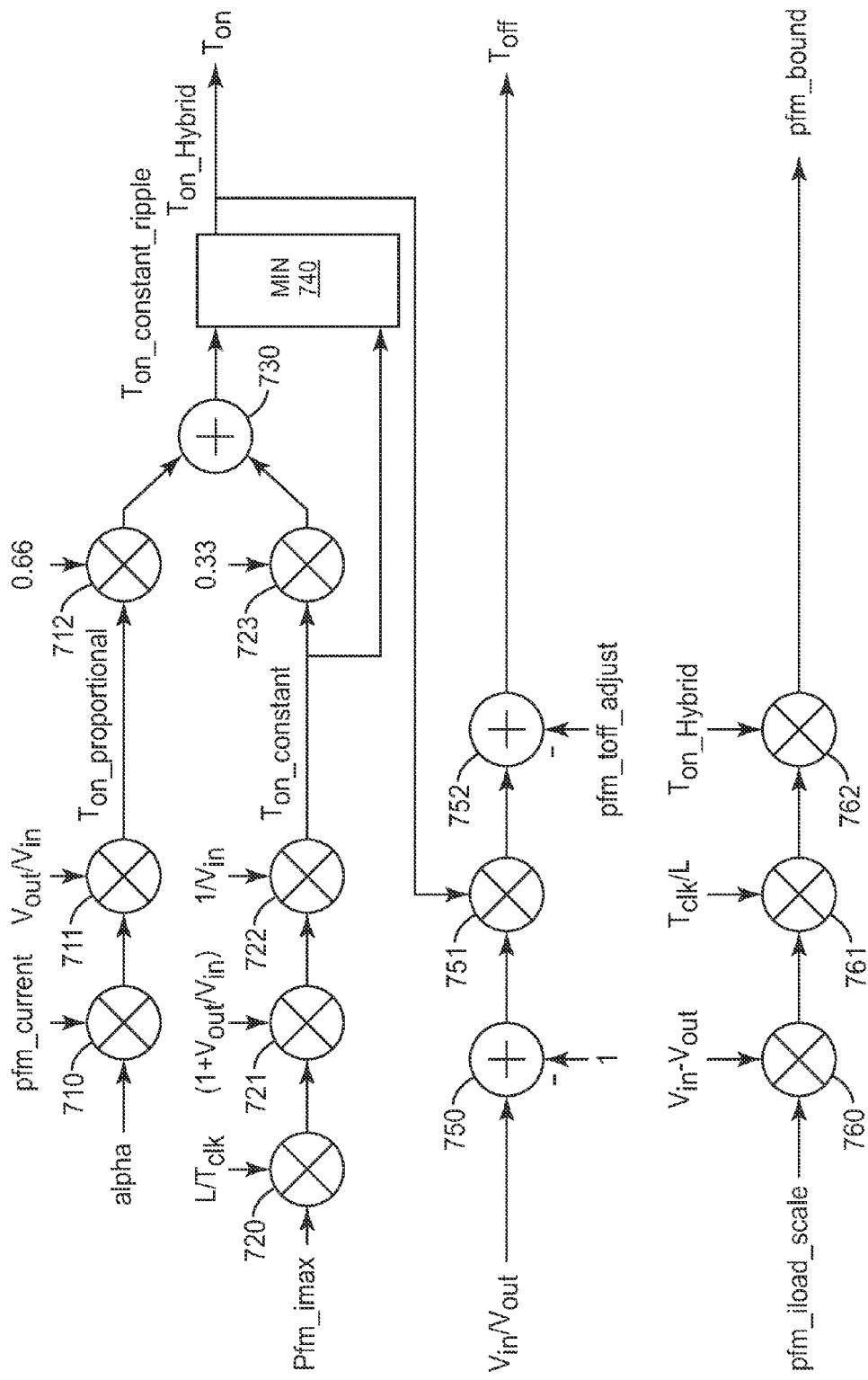
FIG. 7 illustrates a more detailed method of computing PFM timing.

Referring now to FIG. 7, the hybrid $T_{on}$ ($T_{on\_Hybrid}$) may be calculated by calculating the proportional $T_{on}$ ($T_{on\_proportional}$), the constant $T_{on}$ ($T_{on\_constant}$), and the constant ripple $T_{on}$ ($T_{on\_constant\_ripple}$). In this embodiment, the proportional $T_{on}$ is calculated by multiplying alpha by the output current (pfm_current) (710) and then multiplying by the ratio of output voltage ($V_{out}$) to input voltage ($V_{in}$) (711). Constant $T_{on}$ is calculated by multiplying max PFM current (Pfm_imax) with the ratio of the output inductance (L) to the clock time ($T_{clk}$) (720), then multiplied by one plus the ratio of output voltage $V_{out}$ to the input voltage $V_{in}$ (721) divided by input voltage $V_{in}$ (722). In this embodiment, Proportional $T_{on}$ is scaled by 0.66 (712), while constant $T_{on}$ is scaled by 0.33 (723) and the resulting scaled values are added (730) resulting in the constant ripple $T_{on}$ ($T_{on\_constant\_ripple}$). The hybrid $T_{on}$ ($T_{on\_Hybrid}$) is computed by taking the minimum of constant ripple $T_{on}$ and constant $T_{on}$ (740). In this embodiment, the PFM off-time $T_{off}$ is then calculated by subtracting 1 from the ratio of the input voltage $V_{in}$ to the output voltage $V_{out}$ (750), multiplying by hybrid $T_{on}$ (751) and adding/subtracting the adjustment parameter (pfm_toff_adjust) (752).

In one embodiment, the HIZ time $T_{HIZ}$ may comprise a function of the output voltage, the PFM on-time $T_{on}$, and the PFM off-time $T_{off}$. The relationship between the PFM on-time $T_{on}$, the PFM off-time $T_{off}$, the HIZ time $T_{HIZ}$, and the output is shown in the following equation:

$$\frac{T_{on} + T_{off}}{T_{on} + T_{off} + T_{HIZ}} = \frac{2 \cdot L \cdot I_{load}}{(V_{in} - V_{out}) \cdot T_{on}}$$

The HIZ time $T_{HIZ}$ may be increased to reduce the output voltage $V_{out}$ and decreased to increase the output voltage $V_{out}$. In one embodiment, the HIZ time $T_{HIZ}$ may be used to maintain the output voltage $V_{out}$ relatively constant under closed loop control.

In another embodiment, the HIZ time $T_{HIZ}$ may be set by a servo-loop. In this embodiment, a circuit may be configured to maintain an output voltage. In one embodiment the servo-loop comprises a comparator configured place the controller 110 into the HIZ stage 201 when substantially zero current is passing through the output inductor 160. The controller 110 may then leave the HIZ stage 201 when a threshold has been reached. In one embodiment, the threshold comprises a minimum output voltage. In one embodiment, the threshold may be offset by a programmable value to optimize DC voltage. In one embodiment, the programmable voltage may be configured to allow for extra headroom and/or to avoid voltage sag when output current increases.

In one embodiment, the maximum PFM current threshold (pfm_bound) may be the maximum output current that can be sustained by the switching regulator 100 while the controller 110 is operating in the PFM mode 210. If the output current exceeds the maximum PFM current threshold pfm_bound, the controller 110 transitions from the PFM mode 200 to the PWM mode 210. The maximum PFM current threshold pfm_bound may be calculated in any appropriate manner, such as using the current scale pfin_iload_scale, the input voltage $V_{in}$, the output voltage $V_{out}$, the clock $T_{clk}$, the output inductance L, and the PFM on-time $T_{on}$ as shown in the following equation:

$$\text{pfm\_bound} = \text{pfm\_iload\_scale} \cdot (V_{in} - V_{out}) \cdot \frac{T_{clk}}{L} \cdot T_{on}$$

Figure 8:
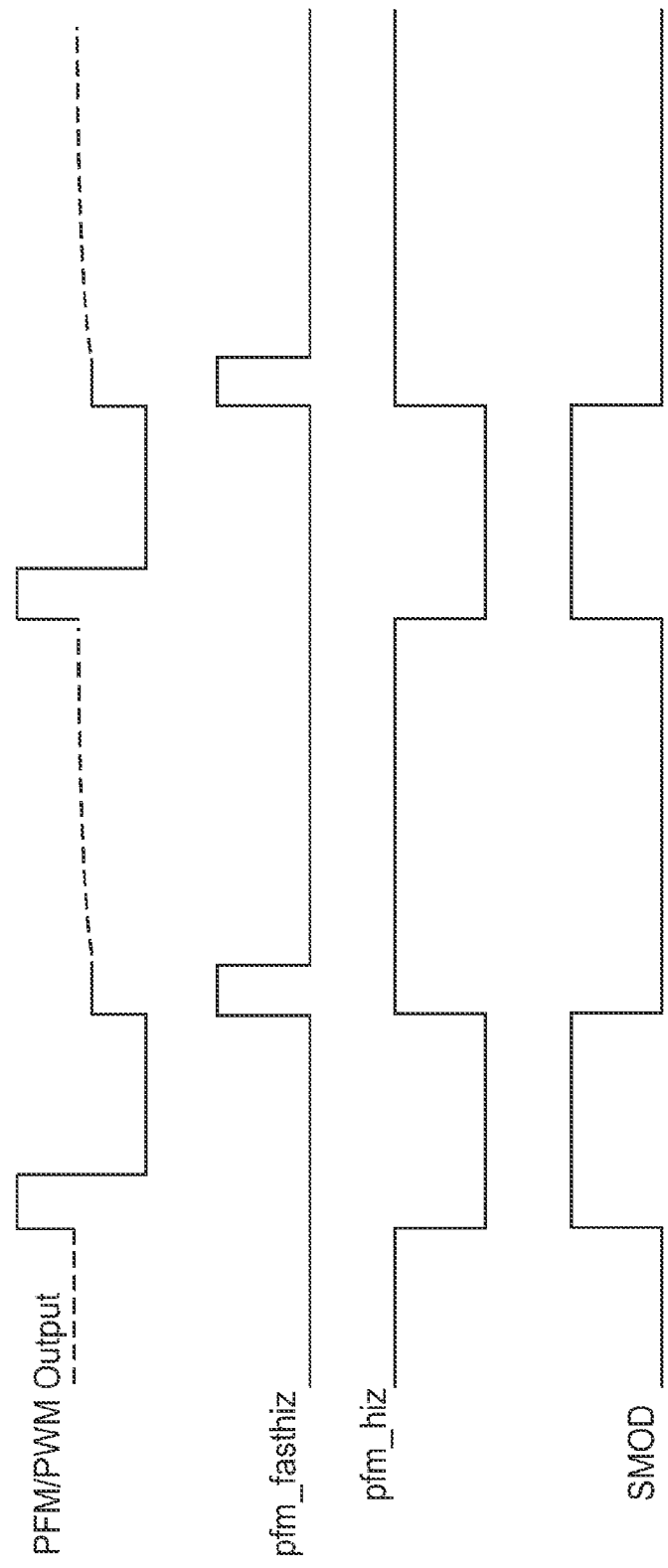
FIG. 8 illustrates various waveforms generated in PFM mode.

Referring now to FIG. 8, various waveforms generated during the operation of one embodiment of the controller 110 in the PFM mode 210 may indicate the effective output being driven high, driven low, driven to close to HIZ, and then drifting to HIZ (dashed line). In one embodiment, a PFM_fasthiz waveform may be generated. In one embodiment, the PFM_fasthiz signal is used by the controller 110 to control a circuit that drives switching regulator 100 towards having no inductor current, i.e. the HIZ state. In one embodiment, the controller 110 produces a HIZ waveform that may be configured to signal when the switching regulator is in the HIZ mode. In another embodiment, the controller 110 produces a SMOD signal. The SMOD signal may be used to indicate that the switching regulator 100 is not in the HIZ mode. In one embodiment, the SMOD output may be used to enable/disable the switching regulator's 100 power stage.

The controller 110 may be adapted to operate in conjunction with signals other than binary signals, such as multi-bit or multi-level signals. The controller 110 may include additional and/or substitute circuit elements to accommodate non-binary signals. For example, in one embodiment, the controller 110 further comprises a tri-level output buffer driver adapted to generate a three-level output signal in response to the input signals for a desired state. Thus, the tri-level output buffer driver may generate a high output for the PFM_HIGH state, a low signal for the PFM_LOW state, and a mid-level signal for the HIZ state. The buffer driver may further comprise a fast HIZ circuit configured to temporarily drive the switching regulator 100 into the HIZ state, reducing the RC time constant required to transition from a low or high output to HIZ.

Figure 9:
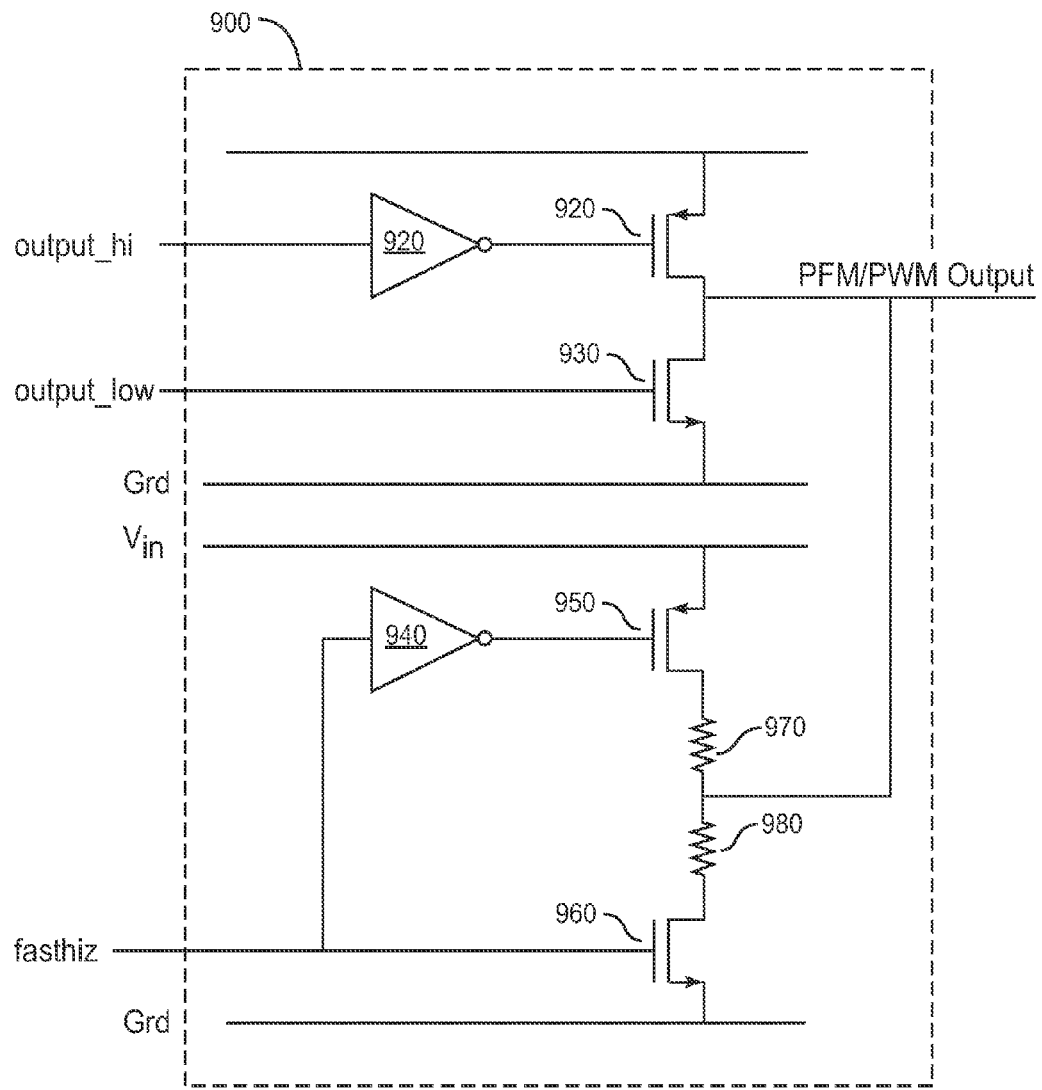
FIG. 9 illustrates PFM waveforms.

The buffer driver may be implemented in any suitable manner to accommodate the various input and output signals. Referring to FIG. 9, in one embodiment, an exemplary buffer driver 900 may respond to an output high signal, an output low signal, and a fasthiz signal and drive the output of the controller 110, such as by generating a tri-level output signal to drive the switches 140, 150 or the drivers 120, 130. In one embodiment, the tri-level output buffer 900 comprises an inverter 910, a first switch 920, a second switch 930, a second inverter 940, a third switch 950, a fourth switch 960, a first resistor 970, and a second resistor 980. When the asserted input signal is output_hi, the buffer driver turns on the first switch 920, driving the output signal high and causing the power switch 140 to be activated. When the output_low signal is asserted, the buffer driver 900 turns on the second switch 930, which drives the output signal low and causes the synchronous switch 150 to be activated. When the fasthiz signal is asserted, the first switch 920 and the second switch 930 remain off. An input buffer of the buffer driver 900 may be biased by a resistor divider comprising the first resistor 970 and the second resistor 980 such that when the fasthiz signal is high, the resistor divider biases the output signal to a mid-level voltage. The resistors 970, 980 may be selected to provide the desired output voltage for the HIZ signal.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and, unless otherwise noted, are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method of regulating voltage by a voltage regulator including a digital controller, the method comprising:
    calculating a first PFM on time based on an input voltage of the voltage regulator and an output voltage of the voltage regulator;
    calculating a second PFM on time different than the first PFM on time based on the input voltage and the output voltage, at least one of the first and second PFM on times being further based on a period of a main clock for the digital controller;
    selecting only one of the first PFM on time and the second PFM on time according to a selection criteria; and
    activating and deactivating at least one switch according to the selected PFM on time.

2. A method of regulating voltage according to claim 1, wherein calculating the first PFM on time comprises calculating a constant ripple PFM on time.

3. A method of regulating voltage according to claim 1, wherein calculating the first PFM on time comprises calculating a constant PFM on time.

4. A method of regulating voltage according to claim 1, further comprising calculating a PFM off time according to the PFM on time.

5. A method of regulating voltage according to claim 4, wherein calculating the PFM off time further comprises adjusting the PFM off time according to a programmable offset.

6. A method of regulating voltage according to claim 1, further comprising calculating a PFM off time according to an estimate of when an output inductor current will be substantially zero.

7. A method of regulating voltage according to claim 1, further comprising calculating a high impedance (HIZ) time wherein the HIZ time is calculated to control a minimum output voltage.

8. A method of regulating voltage according to claim 1, further comprising calculating high impedance (HIZ) wherein the HIZ time is determined by a comparator configured to detect when an output voltage drops below a threshold.

9. A method of regulating voltage according to claim 1, wherein the selection criteria corresponds to a shortest one of the first PFM on time and the second PFM on time.

10. A method of regulating voltage according to claim 1, further comprising transitioning from a first switching mode to the second switching mode according to an output condition.

11. A method of regulating voltage as in claim 10, wherein the first switching mode comprises a low output current mode and the second switching mode comprises a high output current mode.

12. A voltage regulator, comprising:
at least one switch;
an inductor coupled to the switch; and
a digital controller configured to:
calculate a first PFM on time based on an input voltage of the voltage regulator and an output voltage of the voltage regulator;
calculate a second PFM on time different than the first PFM on time based on the input voltage and the output voltage, at least one of the first and second PFM on times being further based on a period of a main clock for the digital controller;
select one of the first PFM on time and the second PFM on time according to a selection criteria; and
activate and deactivate the at least one switch according to the selected PFM on time.

13. A voltage regulator according to claim 12, wherein the first PFM on time comprises a constant ripple PFM on time.

14. A voltage regulator according to claim 12, wherein the second PFM on time comprises a constant PFM on time.

15. A voltage regulator according to claim 12, wherein the controller is further configured to calculate a PFM off time according to the PFM on time.

16. A voltage regulator according to claim 12, wherein the controller is further configured to calculate a PFM off time according to an estimate of when a current through the inductor is substantially zero.

17. A voltage regulator according to claim 12, further comprising a comparator configured to measure an output voltage and set a high impedance (HIZ) time.

18. A voltage regulator according to claim 12, wherein the controller is further configured to generate a tri-level signal, wherein the tri-level signal controls when the at least one switch is activated and deactivated.

19. A voltage regulator according to claim 12, wherein the controller comprises a fast high impedance (HIZ) circuit configured to temporarily drive the voltage regulator into a HIZ state.

20. A voltage regulator according to claim 19, wherein the fast HZ HIZ circuit comprises:
a first switch coupled to an input voltage;
a first resistor coupled to the first switch;
a second resistor coupled to the first resistor and a second switch; and
an output connected between the first resistor and the second resistor wherein the first switch and the second switch are configured to activate substantially synchronously to drive an output voltage to an intermediate voltage level corresponding to a HIZ level.

21. A voltage regulator according to claim 12, wherein the first PFM on time is based on a difference between the input voltage of the voltage regulator and the output voltage of the voltage regulator.

22. A voltage regulator according to claim 21, wherein the first PFM on time is further based on a constant that accounts for a maximum acceptable current of the voltage regulator and the value of the inductor coupled to the switch.

23. A voltage regulator according to claim 12, wherein the second PFM on time is based on a ratio of the output voltage of the voltage regulator over the input voltage of the voltage regulator.

24. A voltage regulator according to claim 23, wherein the ratio of the output voltage of the voltage regulator to the input voltage of the voltage regulator is multiplied by a constant associated with an acceptable voltage ripple for the voltage regulator and a current switching period of the digital controller.

25. A voltage regulator according to claim 24, wherein the constant comprises a value representing the acceptable voltage ripple multiplied by a ratio of a switching period of the digital controller over the period of the main clock for the digital controller.

* * * * *